United States Patent
Ishii et al.

(10) Patent No.: US 9,634,762 B2
(45) Date of Patent: Apr. 25, 2017

(54) OPTICAL TRANSMISSION SYSTEM, NODE APPARATUS, AND REACHABILITY DETERMINATION METHOD

(71) Applicant: FUJITSU LIMITED, Kawasaki-shi, Kanagawa (JP)

(72) Inventors: Shigeru Ishii, Shinagawa (JP); Ryosuke Goto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/070,128

(22) Filed: Mar. 15, 2016

(65) Prior Publication Data

US 2016/0211910 A1 Jul. 21, 2016

Related U.S. Application Data

(62) Division of application No. 14/043,143, filed on Oct. 1, 2013, now Pat. No. 9,319,132.

(30) Foreign Application Priority Data

Nov. 14, 2012 (JP) ................................ 2012-250689

(51) Int. Cl.
*H04B 10/079* (2013.01)
*H04B 10/077* (2013.01)
*H04Q 11/00* (2006.01)

(52) U.S. Cl.
CPC ..... *H04B 10/0791* (2013.01); *H04B 10/0775* (2013.01); *H04B 10/0793* (2013.01);
(Continued)

(58) Field of Classification Search
CPC .......... H04B 10/07951; H04B 10/0791; H04B 10/0795; H04B 10/0775; H04B 10/0793;
(Continued)

(56) References Cited

U.S. PATENT DOCUMENTS 6,301,244 B1 10/2001 Huang et al.
7,983,558 B1 7/2011 Gerstel et al.
(Continued)

FOREIGN PATENT DOCUMENTS

JP 2009-118101 5/2009

OTHER PUBLICATIONS

U.S. Appl. No. 14/043,143, filed Oct. 1, 2013, Shigeru Ishii, et al., Fujitsu Limited.
(Continued)

*Primary Examiner* — Leslie Pascal
(74) *Attorney, Agent, or Firm* — Staas & Halsey LLP

(57) ABSTRACT

A node apparatus is installed at a node located on a route from a start node to an end node, and includes: a parameter calculating unit configured to, upon receiving routing information specifying the route and a first parameter representing an amount of signal degradation, update the first parameter by using a second parameter representing an amount of signal degradation along a transmission route to an adjacent node, and generate a third parameter representing an amount of signal degradation along a transmission route between the start node and the node, specified by the routing information; and a determination unit configured to determine reachability of the route specified by the routing information in accordance with the third parameter and a fourth parameter representing an amount of signal degradation along a transmission route from the node to the end node specified by the routing information.

3 Claims, 18 Drawing Sheets

(52) U.S. Cl.
CPC ... *H04B 10/0795* (2013.01); *H04B 10/07953* (2013.01); *H04Q 11/0005* (2013.01); *H04Q 2011/0043* (2013.01)

(58) Field of Classification Search
CPC ......... H04B 10/07953; H04Q 11/0005; H04Q 2011/0043
See application file for complete search history.

(56) References Cited

U.S. PATENT DOCUMENTS

2009/0116833 A1    5/2009    Shimizu et al.
2013/0039651 A1*   2/2013    Sadananda ......... H04Q 11/0062
                                                        398/26

OTHER PUBLICATIONS

Office Action issued Feb. 20, 2015 in U.S. Appl. No. 14/043,143.
Office Action issued May 26, 2015 in U.S. Appl. No. 14/043,143.
Office Action issued Sep. 23, 2015 in U.S. Appl. No. 14/043,143.
Notice of Allowance and Fee(s) Due mailed Jan. 7, 2016 in U.S. Appl. No. 14/043,143.
Japanese Office Action dated May 10, 2016 in corresponding Japanese Patent Application No. 2012-250689.

* cited by examiner

FIG. 3

| MESSAGE TYPE | ROUTING INFORMATION | CUMULATIVE PARAMETER (AMOUNT OF DEGRADATION) | NUMBER OF SPANS |
|---|---|---|---|

FIG. 6

|  | #1 | #2 | #3 | #4 | #5 |
|---|---|---|---|---|---|
| CUMULATIVE AMOUNT OF DEGRADATION ON START NODE SIDE | 0 | 1 | 3 | 4 | 6 |
| NUMBER OF SPANS ON START NODE SIDE | 0 | 1 | 2 | 3 | 4 |
| CUMULATIVE AMOUNT OF DEGRADATION ON END NODE SIDE | 6 | 5 | 3 | 2 | 0 |
| NUMBER OF SPANS ON END NODE SIDE | 4 | 3 | 2 | 1 | 0 |
| PERMISSIBLE AMOUNT OF DEGRADATION | 4 | 5 | 7 | 8 | 10 |

FIG. 8

| NUMBER OF SPANS | AMOUNT OF DEGRADATION |
|---|---|
| 1 | 0.1 |
| 2 | 0.2 |
| 3 | 0.5 |
| 4 | 0.9 |
| 5 | 1.4 |
| 6 | 2.0 |
| 7 | 2.7 |
| 8 | 3.5 |
| 9 | 4.4 |
| 10 | 5.4 |

|  | #1-#2 | #2-#3 | #3-#4 | #4-#5 | #1-#6 | #6-#7 | #7-#3 |
|---|---|---|---|---|---|---|---|
| INTER-NODE OSNR [dB] | 30 | 25 | 28 | 27 | 24 | 29 | 31 |

FIG. 13C

|  | #1 | #2 | #3 | #4 | #5 |
|---|---|---|---|---|---|
| CUMULATIVE OSNR ON START NODE SIDE [dB] | — | 30.0 | 25.9 | 23.4 | 20.7 |
| NUMBER OF SPANS ON START NODE SIDE | 0 | 1 | 2 | 3 | 4 |
| CUMULATIVE OSNR ON END NODE SIDE [dB] | 20.7 | 21.2 | 23.6 | 25.5 | — |
| NUMBER OF SPANS ON END NODE SIDE | 4 | 3 | 2 | 1 | 0 |
| PERMISSIBLE OSNR [dB] | 16.4 | 16.2 | 15.7 | 15.4 | — |

| TRANSMISSION ROUTE | BER | Q VALUE | Q VALUE MARGIN |
|---|---|---|---|
| 1-2 | BER1 | Q1 | Q1-Q0 |
| 1-2-3 | BER2 | Q2 | Q2-Q0 |
| 1-2-3-4 | BER3 | Q3 | Q3-Q0 |
| 1-2-3-4-5 | BER4 | Q4 | Q4-Q0 |
| 2-3 | BER5 | Q5 | Q5-Q0 |
| 2-3-4 | BER6 | Q6 | Q6-Q0 |
| 2-3-4-5 | BER7 | Q7 | Q7-Q0 |
| 1-6 | BER8 | Q8 | Q8-Q0 |
| 1-6-7 | BER9 | Q9 | Q9-Q0 |
| 1-6-7-3 | BER10 | Q10 | Q10-Q0 |

Q0 IS A MINIMUM Q VALUE
THAT ENABLES OPTICAL COMMUNICATIONS
IN AN OPTICAL TRANSMISSION SYSTEM

OPTICAL TRANSMISSION SYSTEM, NODE APPARATUS, AND REACHABILITY DETERMINATION METHOD

CROSS-REFERENCE TO RELATED APPLICATION

This application is a divisional of U.S. patent application Ser. No. 14/043,143, filed on Oct. 1, 2013, which was based upon and claimed the benefit of priority of the prior Japanese Patent Application No. 2012-250689, filed on Nov. 14, 2012, the entire contents of which are incorporated herein by reference.

FIELD

The embodiments discussed herein are related to an optical transmission system, a node apparatus used in the optical transmission system, and a method of determining reachability of a transmission route.

BACKGROUND

A switching function that dynamically switches between optical transmission routes is desired in optical transmission systems today. For example, if a fault occurs in a given route, immediately establishing a bypass route is desirable.

Reachability determination is performed on a new optical transmission route candidate when an optical transmission route is switched from one to another. Reachability determination is performed on the optical transmission route by comparing a communication quality obtained when an optical signal is transmitted along the optical transmission route as a measurement target with a threshold value of the communication quality permissible in the system. If the optical transmission route is determined as reachable, route switching is performed so that the optical signal is transmitted through the optical transmission route. If the optical transmission route is determined as not reachable, the reachability determination is performed on a next candidate.

The switching between the optical transmission routes is desirably completed within a short period of time. In particular, the switching between the optical transmission routes subsequent to the occurrence of a fault is to be performed within a short period of time. To switch from one optical transmission route to another within a short period of time, the route reachability determination is desirably performed on the optical transmission route.

If the route reachability determination is performed in advance on all the routes between desired nodes, and the results are stored on a network management server, it is possible to perform the route reachability determination on the optical transmission route within a short period of time. However, the number of routes to perform the transmission reachability determination on is too large in a large-scale network, and costs involved become prohibitive.

To address this problem, a method of determining reachability of the route in an autonomous fashion in an optical communication network has been disclosed (Japanese Laid-open Patent Publication No. 2009-118101). In the disclosed method, each optical network apparatus stores as a database a parameter related to the size of a factor contributing to signal degradation, and the parameter is relayed via a path route through which a signal passes. Each optical network apparatus cumulatively adds a parameter thereof to the value of a received parameter, and then transmits the resulting value to a next optical network apparatus. An optical network apparatus that serves as a terminal of the path estimates the size of the signal degradation of all the paths using the received parameter, and thus determines whether the path is able to transmit the signal at a quality equal to or higher than a specific level.

SUMMARY

According to an aspect of the invention, a node apparatus is installed at a node located on a route from a start node to an end node, the node apparatus includes: a parameter calculating unit configured to, upon receiving routing information specifying the route and a first parameter representing an amount of signal degradation, update the first parameter by using a second parameter representing an amount of signal degradation along a transmission route to an adjacent node, and generate a third parameter representing an amount of signal degradation along a transmission route between the start node and the node, specified by the routing information; and a determination unit configured to determine reachability of the route specified by the routing information in accordance with the third parameter generated by the parameter calculating unit and a fourth parameter representing an amount of signal degradation along a transmission route from the node to the end node specified by the routing information.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of the structure of a determination message;

FIG. 6 illustrates an embodiment of degradation information and number-of-span information, stored on each node;

FIG. 8 illustrates an example of a database in which number of spans dependent amount of degradation is stored;

FIG. 13A through FIG. 13C illustrate an embodiment to determine transmission reachability of an optical transmission route in accordance with OSNR;

DESCRIPTION OF EMBODIMENTS

When the transmission reachability determination is performed on a new transmission route in the method of determining reachability of the path in an autonomous fashion, a parameter related to signal degradation over the optical transmission route from a start node to an end node is also transmitted. Determination results are obtained at the end node. Time to determine transmission reachability may become longer.

The following embodiments provide an optical transmission system and a node apparatus that feature shorter time to determine reachability of a specified optical transmission route.

First Embodiment

Figure 1:
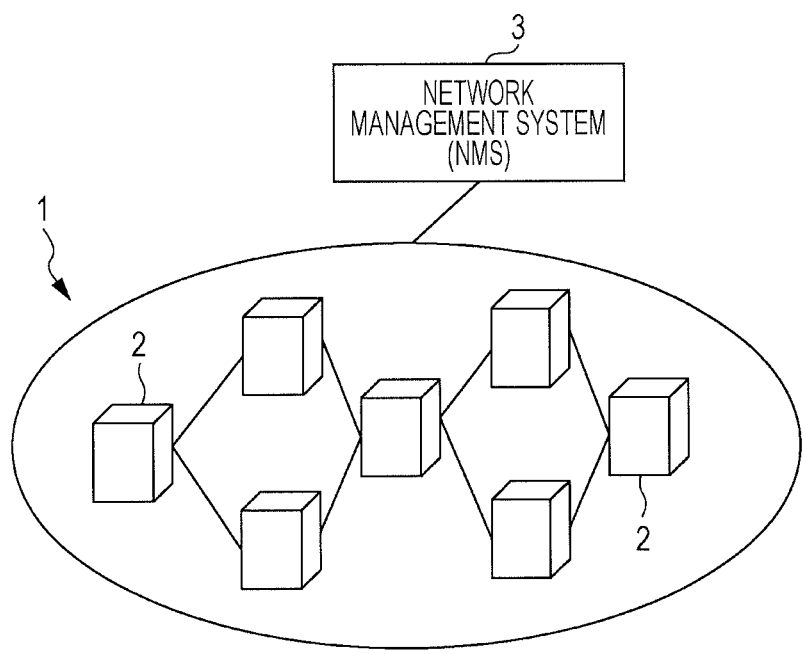
FIG. 1 illustrates an example of an optical transmission system of a first embodiment.

FIG. 1 illustrates an example of an optical transmission system 1 of a first embodiment. The optical transmission system 1 includes a plurality of node apparatuses 2. Each node apparatus 2 is connected to one or more other node apparatuses (namely, adjacent node apparatuses) via an optical fiber line. In other words, the node apparatus 2 may transmit an optical signal to one or more adjacent node apparatuses. Each node apparatus 2 is a wavelength division multiplexing (WDM) apparatus that transmits a WDM signal, for example. In such a case, each node apparatus 2 may be a reconfigurable optical add-drop multiplexer (ROAMD).

The optical transmission system 1 includes a network management system (NMS) 3. The network management system 3 controls the optical transmission system 1. For example, the network management system 3 may set an optical path in the optical transmission system 1 and control switching of the optical paths.

The network management system 3 may set up an optical path between desired nodes (or between nodes specified by a user). In the following discussion, one end point of the optical path may be occasionally referred to as a "start node", and the other end point of the optical path is referred to as an "end node". Node apparatuses installed at the start node and the end node may be occasionally referred to as a "start node apparatus" and an "end node apparatus", respectively. A route extending from the start node to the end node via one or more nodes therebetween may be occasionally referred to as an "optical transmission route".

When a new optical path is set up, the network management system 3 determines reachability of an optical transmission route of the optical path. For example, an optical signal may be transmitted from the start node to the end node via a specified optical transmission route. If the communication quality of a signal received at the end node is higher than a threshold value of the communication quality permitted in the system, the network management system 3 determines that the optical transmission route is reachable. The network management system 3 then sets up an optical path along the optical transmission route. If the communication quality of the signal received at the end node is lower than the threshold value of the communication quality permitted in the system when the optical signal is transmitted from the start node to the end node via the specified optical transmission route, the network management system 3 determines that the optical transmission route is not reachable. In such a case, the network management system 3 searches for another optical transmission route.

In the first embodiment, the network management system 3 requests a node apparatus on the optical transmission route as a determination target to perform transmission reachability determination. The network management system 3 then receives results of the transmission reachability determination from that node.

Figure 2:
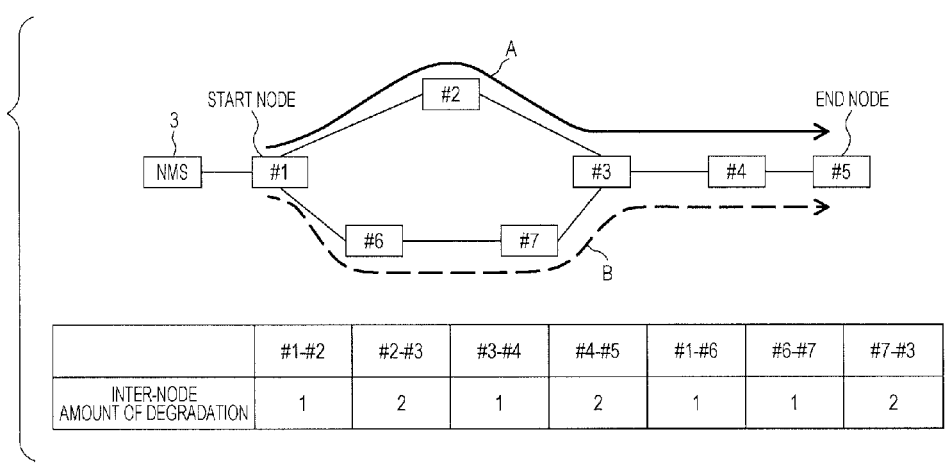
FIG. 2 illustrates an example of a transmission reachability determination method of the first embodiment.

FIG. 2 illustrates an example of a transmission reachability determination method of the first embodiment. An optical transmission system in the embodiment of FIG. 2 includes seven node apparatuses. In the following discussion, the nodes are identified by locations of node apparatuses thereof (#1 through #7). More specifically, node apparatuses #1, #2, #3, . . . , and #7 respectively represent the node apparatuses at the nodes #1, #2, #3, . . . , and #7.

In the example of FIG. 2, an optical path is set along an optical transmission route A extending from the node apparatus #1 to the node apparatus #5 via the node apparatuses #2, #3, and #4. In this case, the node #1 is the start node and the node #5 is the end node.

Each of the node apparatuses #1 through #7 stores a parameter representing an amount of degradation along the transmission line to each adjacent node. The amount of degradation represents the degree of degradation of quality of the optical signal. The amount of degradation described herein in the embodiment refers to an explanatory value and the unit of amount of degradation is not limited to any particular unit (or dimension).

An inter-node amount of degradation #1-#2 represents the degree of degradation of the quality of the optical signal when the optical signal is transmitted from the node apparatus #1 to the node apparatus #2. The inter-node amount of degradation #1-#2 is stored in a memory of each of the node apparatus #1 and the node apparatus #2. Similarly, an inter-node amount of degradation #2-#3 represents the degree of degradation of the quality of the optical signal when the optical signal is transmitted from the node apparatus #2 to the node apparatus #3. The inter-node amount of degradation #2-#3 is stored in a memory of each of the node apparatus #2 and the node apparatus #3. Data representing another inter-node amount of degradation is also stored in a memory of the corresponding node apparatus.

The node apparatuses #1 through #7 measure the inter-node amounts of degradation by transmitting and receiving pilot signals to and from each adjacent node apparatus. The node apparatuses #1 through #7 store the measured inter-node amounts of degradation on memories thereof. The node apparatuses #1 through #7 may measure the inter-node amounts of degradation using another method or may calculate the inter-node amounts of degradation in simulation.

When an optical path is set up along the optical transmission route A, the network management system 3 gives a determination instruction to the start node of the optical transmission route A. The determination instruction includes information identifying each node apparatus along the route as a determination target. In the present embodiment, the network management system 3 gives to the node apparatus #1 a determination instruction to determine reachability of the optical transmission route A. In this case, the determination instruction includes "routing information: #1, #2, #3, #4, and #5". As illustrated in FIG. 2, the network management system 3 is connected to the start node apparatus (the node apparatus #1) for simplicity of viewing the drawings. The network management system 3 may also transmit to the start node apparatus via one or more node apparatuses.

Upon receiving the determination instruction, the node apparatus #1 generates a determination message. As illustrated in FIG. 3, the determination message includes fields for a "message type", "routing information", a "cumulative parameter", and "number of spans". A value identifying the determination message is set in the message type field. The routing information provided by the network management system 3 is set in the routing information field. The cumulative parameter and the number of spans are described below.

Figure 4:
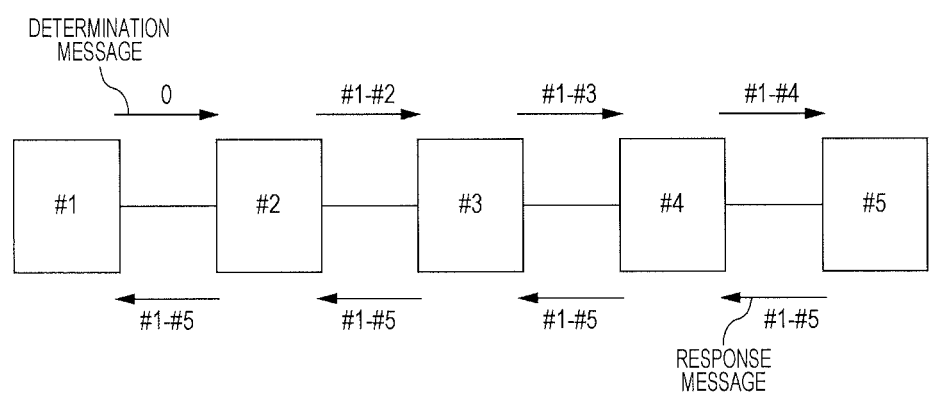
FIG. 4 illustrates a transmission of the determination message and response message.

The node apparatus #1 transmits the generated determination message to a downstream adjacent node in accordance with the routing information. In this example, the node apparatus #1 transmits the determination message to the node apparatus #2 as illustrated in FIG. 4. In this case, "zero" is set as the "cumulative parameter" and the "number of spans".

Upon receiving the determination message from the node apparatus #1, the node apparatus #2 updates the cumulative parameter by adding the inter-node amount of degradation #1-#2 to the cumulative parameter contained in the determination message. The updated cumulative parameter represents a cumulative amount of degradation generated along the route from the start node (the node #1) to the node apparatus #2. The inter-node amount of degradation #1-#2 is pre-measured and stored in the memory of the node apparatus #2 as described above.

The node apparatus #2 sets the "cumulative parameter" contained in the determination message to the updated cumulative parameter. The node apparatus #2 increments the "number of spans" contained in the determination message by one. The node apparatus #2 also transmits the generated determination message to a downstream adjacent node in accordance with the routing information. More specifically, the node apparatus #2 transmits the determination message to the node apparatus #3.

As the node #2, the node apparatuses #3 and #4 update the "cumulative parameter" and the "number of spans" contained in the determination message and respectively transmit the updated determination messages to next node apparatuses. In FIG. 4, a label "#1-#3" represents a cumulative amount of degradation generated along the transmission route of from the node apparatus #1 to the node apparatus #3 and a label "#1-#4" represents a cumulative amount of degradation generated along the transmission route of from the node apparatus #1 to the node apparatus #4.

Upon receiving the determination message from the node apparatus #4, the node apparatus #5 updates the "cumulative parameter" and the "number of spans" as the node apparatuses #2 through #4 do. The cumulative parameter of the determination message the node apparatus #5 receives is a cumulative amount of degradation (#1-#4) generated along the route from the node apparatus #1 to the node apparatus #4. The node apparatus #5 adds the inter-node amount of degradation #4-#5 to the cumulative parameter. As a result, the inter-node amount of degradation #1-#5 generated along the route from the node apparatus #1 to the node apparatus #5 is thus calculated. In the example of FIG. 2, the inter-node amount of degradation #1-#5=6 results. The node apparatus #5 updates the "number of spans" to "4".

The node apparatus #5 is located at the end node of the optical transmission route A. The node apparatus #5 generates a response message. As the determination message, the response message also includes fields for the "message type", the "routing information", the "cumulative parameter", and the "number of spans". In the response message, however, a value identifying the response message is set in the message type field. The same routing information as the routing information in the determination message is set in the routing information field. The cumulative amount of degradation #1-#5 generated along the route from the node apparatus #1 to the node apparatus #5 is set in the cumulative parameter field. The value last updated at the node apparatus #5 (that is, the number of spans of the route from the node apparatus #1 to the node apparatus #5) is set in the number-of-spans field.

The response message transmitted from the node apparatus #5 is transmitted in an opposite direction to the direction of the determination message along the route specified by the routing information as illustrated in FIG. 4. More specifically, the response message transmitted from the node apparatus #5 is transmitted via the node apparatus #4, the node apparatus #3, and the node apparatus #2 and then arrives at the node apparatus #1. Each of the node apparatuses #4 through #1 obtains the "cumulative parameter" and the "number of spans" contained in the response message. More specifically, the node apparatuses #1 through #5 detect the cumulative amount of degradation #1-#5 along the optical transmission route A and the number of spans.

Figure 5:
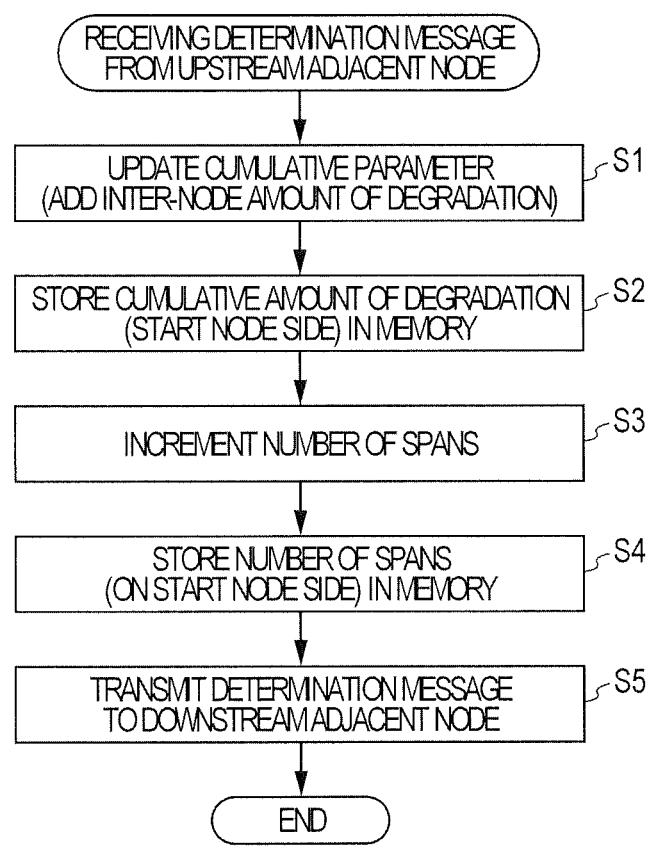
FIG. 5 is a flowchart illustrating an example of a determination message transmission process performed by each node apparatus.

FIG. 5 is a flowchart illustrating an example of a determination message transmission process performed by each node apparatus. The process of this flowchart is performed when the determination message is received from an upstream adjacent node.

In S1, the node apparatus updates the cumulative parameter contained in the determination message. In this operation, the node apparatus adds the inter-node amount of degradation stored in the memory thereof to the cumulative parameter contained in the determination message. As a result, the cumulative amount of degradation on the start node side is calculated. In S2, the node apparatus stores the cumulative parameter updated in S1 (namely, the cumulative amount of degradation on the start node side) in the memory thereof.

In S3, the node apparatus increments the number of spans contained in the determination message. As a result, the number of spans from the start node to the node apparatus is calculated. In S4, the node apparatus stores the number of spans updated in S3 (namely, the number of spans from the start node to the node apparatus) in the memory thereof. In S5, the node apparatus transmits to a downstream adjacent node apparatus the determination message with the updated cumulative parameter and number of spans.

FIG. 6 illustrates an embodiment of degradation information and number-of-span information to be stored on each node apparatus. As illustrated in FIG. 6, information to be respectively stored on the node apparatuses #1 through #5 is listed up.

The node apparatus #1 is located at the position of the start node of the optical transmission route A. The memory of the node apparatus #1 thus stores "a cumulative amount of degradation on the start node side=0".

The memory of the node apparatus #2 stores an amount of degradation along the transmission route from the start node to the node apparatus #2 as "a cumulative amount of degradation on the start node side". The inter-node amount of degradation #1-#2 is "1" as listed in FIG. 2. The memory of the node apparatus #2 thus stores "a cumulative amount of degradation on the start node side=1 (=0+1)".

The memory of the node apparatus #3 stores an amount of degradation along the transmission route from the start node to the node apparatus #3 as "a cumulative amount of degradation on the start node side". The inter-node amount of degradation #2-#3 is "2" as listed in FIG. 2. The memory of the node apparatus #3 thus stores "a cumulative amount of degradation on the start node side=3 (=1+2)".

The memory of the node apparatus #4 stores an amount of degradation along the transmission route from the start node to the node apparatus #4 as "a cumulative amount of degradation on the start node side". The inter-node amount of degradation #3-#4 is "1" as listed in FIG. 2. The memory of the node apparatus #4 thus stores "a cumulative amount of degradation on the start node side=4 (=3+1)".

The memory of the node apparatus #5 stores an amount of degradation along the transmission route from the start node to the node apparatus #5 as "a cumulative amount of degradation on the start node side". The inter-node amount of degradation #4-#5 is "2" as listed in FIG. 2. The memory of the node apparatus #5 thus stores "a cumulative amount of degradation on the start node side=6 (=4+2)". The memories of the node apparatuses #1 through #5 store, as the number-of-span information (the number of spans from the start node to the node apparatus of interest), "0", "1", "2", "3", and "4". The cumulative amount of degradation on the end node side, the number of spans on the end node side, and the inter-node amount of degradation are described below.

Figure 7:
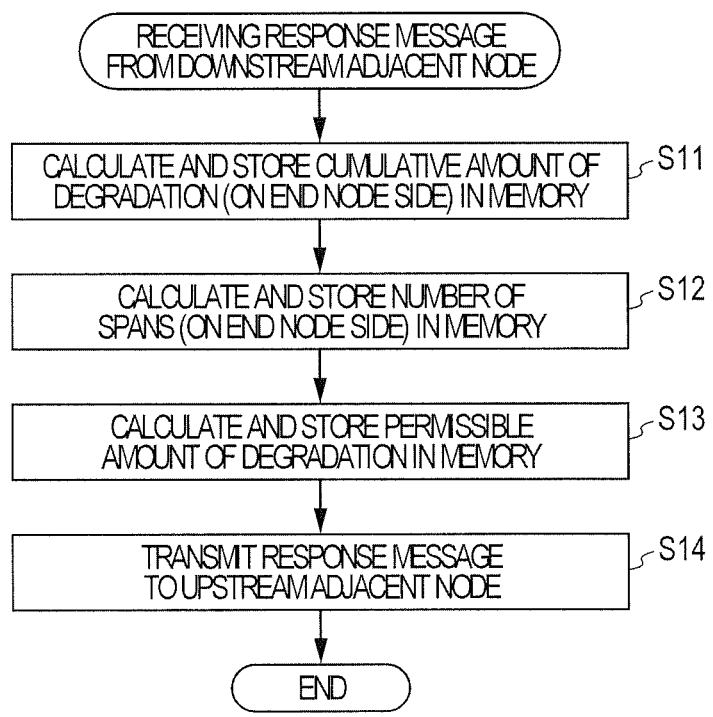
FIG. 7 is a flowchart illustrating an example of a response message transmission process performed by each node apparatus.

FIG. 7 is a flowchart illustrating an example of a response message transmission process performed by each node apparatus. The process of the flowchart is performed when a response message is received from an adjacent node on the downstream side.

In S11, the node apparatus calculates the cumulative amount of degradation on the end node side, and stores the calculated cumulative amount of degradation in the memory thereof. The cumulative amount of degradation on the end node side is obtained by subtracting the cumulative amount of degradation on the start node side from the cumulative amount of degradation #1-#5 contained in the response message.

In S12, the node apparatus calculates the number of spans on the end node side and stores the calculated number of spans in the memory thereof. The number of spans on the end node side is obtained by subtracting the number of spans on the start node side from the number of spans contained in the response message.

In S13, the node apparatus calculates a permissible amount of degradation and stores the permissible amount of degradation in the memory thereof. The permissible amount of degradation is obtained by subtracting the cumulative amount of degradation on the end node side from a maximum amount of degradation. The maximum amount of degradation is a threshold value according to which transmission reachability of the optical transmission route is determined. More specifically, if the amount of degradation of an optical signal transmitted from the start node to the end node is above the maximum amount of degradation, quality of the optical signal at the end node is lower than a threshold value of communication quality permitted in the system. In such a case, the optical transmission route is determined as not reachable. On the other hand, if the amount of degradation of the optical signal transmitted from the start node to the end node is equal to or lower the maximum amount of degradation, quality of the optical signal at the end node is equal to or higher than the threshold value of communication quality permitted in the system. In such a case, the optical transmission route is determined as reachable. In the embodiment, the maximum amount of degradation is "10". The node apparatus transmits the response message to an adjacent node on the upstream side in S14.

An example of the process in S11 through S13 is described below. Described herein is the process in S11 through S13 that is performed by the node apparatus #3 of FIG. 2.

In S11, the node apparatus #3 calculates the cumulative amount of degradation on the end node side. The cumulative amount of degradation #1-#5 generated along the route from the start node to the end node is "6". The cumulative amount of degradation of the node apparatus #3 on the start node side is "3". The cumulative amount of degradation on the end node side is obtained as "3" by subtracting the cumulative amount of degradation on the start node side from the cumulative amount of degradation #1-#5.

In S12, the node apparatus #3 calculates the number of spans on the end node side. A total number of spans from the start node to the end node is "4". The number of spans of the node apparatus #3 on the start node side is "2". The number of spans on the end node side is obtained as "2" by subtracting the number of spans on the start node side from the total number of spans.

In S13, the node apparatus #3 calculates the permissible amount of degradation. The permissible amount of degradation of the optical transmission system is "10". The cumulative amount of degradation of the node apparatus #3 on the end node side is "3". The permissible amount of degradation is obtained as "7" by subtracting the cumulative amount of degradation on the end node side from the maximum amount of degradation. The calculation results obtained in S11 through S13 are stored in the memory of the node apparatus as illustrated in FIG. 6.

The determination message and the response message are transmitted between the start node and the end node in this way. Each node apparatus along the route obtains the cumulative amount of degradation on the start node side, the number of spans on the start node side, the cumulative amount of degradation on the end node side, the number of spans on the end node side, and the permissible amount of degradation.

The following discussion is based on the assumption that the optical transmission route A is determined as reachable. An optical path is thus set up over the optical transmission route A.

In the optical transmission system having the optical path (that is, the optical transmission route A) set up therewithin, a fault may now occur between the nodes #1 and #2. The fault is detected by the network management system 3. The network management system 3 sets a substitute path between the start node (#1) and the end node (#5). The network management system 3 herein may select an optical transmission route B that starts from the node #1, passes through nodes #6, #7, #3, and #4, and then arrives at #5, as a substitute route between the node #1 and the node #5.

The network management system 3 gives a determination instruction about the optical transmission route B to the start node apparatus (#1) of the optical transmission route B. The determination instruction contains the routing information "#1, #6, #7, #3, #4, and #5" representing the optical transmission route B.

Upon receiving the determination instruction about the optical transmission route B, the node apparatus #1 generates a determination message corresponding to the determination instruction. As described above, the determination message includes the fields for the "message type", the "routing information", the "cumulative parameter", and the "number of spans". A value identifying the determination message is set in the message type field. The routing information provided by the network management system 3 is set in the routing information field. In this case, the routing information indicates the optical transmission route B.

The node apparatus #1 transmits the generated determination message to an adjacent node on the downstream side in accordance with the routing information. The node apparatus #6 is located downstream of the node apparatus #1 along the optical transmission route B. The node apparatus #1 thus transmits the determination message to the node apparatus #6. The "cumulative parameter" and the "number of spans" are respectively set to "zero".

Upon receiving the determination message from the node apparatus #1, the node apparatus #6 updates the cumulative parameter and the number of spans. An inter-node amount of degradation #1-#6 as an amount of degradation along a transmission route between the node apparatuses #1 and #6 is "1". The cumulative parameter is thus updated to "1". The updated cumulative parameter represents a cumulative amount of degradation generated along the transmission route from the start node (i.e., the node #1) to the node apparatus #6. The inter-node amount of degradation #1-#6 is stored in the memory of the node apparatus #6 as described above. The number of spans is updated to "1".

The node apparatus #6 checks whether the node apparatus #6 itself stores a parameter representing an amount of degradation along a transmission route from the node apparatus #6 to the end node (#5) along the optical transmission route B. In the embodiment of FIG. 2, the node apparatus #6 has no such parameter. In such a case, the node apparatus #6 does not determine reachability of the optical transmission route B but transmits the determination message received from the node apparatus #1 to an adjacent node on the downstream side along the optical transmission route B. More specifically, the node apparatus #6 transmits the determination message to the node apparatus #7. The cumulative parameter and the number of spans in the determination message are in a state updated by the node apparatus #6.

Upon receiving the determination message from the node apparatus #6, the node apparatus #7 updates the cumulative parameter and the number of spans. An inter-node amount of degradation #6-#7 representing an amount of degradation between the node apparatuses #6 and #7 is "1". The cumulative parameter is thus updated from "1" to "2". The updated cumulative parameter represents a cumulative amount of degradation caused along the transmission rout extending from the node apparatus #1 to the node apparatus #7 via the node apparatus #6. An inter-node amount of degradation #6-#7 is pre-measured and stored in the memory of the node apparatus #7. The number of spans is updated from "1" to "2".

As the node apparatus #6, the node apparatus #7 checks whether the node apparatus #7 itself stores a parameter representing an amount of degradation along a transmission route from the node apparatus #7 to the end node (#5) along the optical transmission route B. In the embodiment of FIG. 2, the node apparatus #7 has no such parameter. In such a case, the node apparatus #7 does not determine reachability of the optical transmission route B but transmits the determination message received from the node apparatus #6 to an adjacent node on the downstream side along the optical transmission route B. More specifically, the node apparatus #7 transmits the determination message to the node apparatus #3. The cumulative parameter and the number of spans in the determination message are in a state updated by the node apparatus #7.

Upon receiving the determination message from the node apparatus #7, the node apparatus #3 updates the cumulative parameter and the number of spans. An inter-node amount of degradation #7-#3 representing an amount of degradation between the node apparatuses #7 and #3 is "2". The cumulative parameter is thus updated from "2" to "4". The updated cumulative parameter represents a cumulative amount of degradation caused along a transmission rout extending from the node apparatus #1 to the node apparatus #3 via the node apparatuses #6 and #7. An inter-node amount of degradation #7-#3 is pre-measured and stored in the memory of the node apparatus #3. The number of spans is updated from "2" to "3".

As the node apparatus #7, the node apparatus #3 checks whether the node apparatus #3 itself stores a parameter representing an amount of degradation along the transmission route from the node apparatus #3 to the end node (#5) along the optical transmission route B. In the embodiment of FIG. 2, the route from the node apparatus #3 to the node apparatus #5 is commonly shared by the optical transmission route A and the optical transmission route B. Parameters representing amounts of degradation along the transmission route from the node apparatus #3 to the node apparatus #5 via the optical transmission route A are stored in the memory of the node apparatus #3 as illustrated in FIG. 6. In this case, the node apparatus #3 determines reachability of the optical transmission route B using degradation information and number-of-span information about the optical transmission route A.

The node apparatus #3 calculates the total number of spans of the optical transmission route B. The number of spans of the node apparatus #3 on the start node side is "3". The number of spans of the node apparatus #3 on the end node side is identical to that on the optical transmission route A, that is, "2". The total number of spans along the optical transmission route B is thus "5".

If an optical signal is transmitted from the start node to the end node, signal degradation dependent on the number of spans may occur. Non-linearity with respect to the number of spans is typically characteristic of the signal degradation dependent on the number of spans. The signal degradation dependent on the number of spans may be measured in advance or determined in simulation. In the optical transmission system of the first embodiment, each of the node apparatuses #1 through #7 includes a database in which the amount of degradation dependent on the number of spans is stored. FIG. 8 illustrates an example of the database in which the amount of degradation dependent on the number of spans is stored.

The node apparatus #3 retrieves the amount of degradation corresponding to the total number of spans along the optical transmission route B by referring to the database of FIG. 8. Since the total number of spans along the optical transmission route B is "5", the amount of degradation dependent on the number of spans is "1.4".

The node apparatus #3 compares the sum of "the cumulative amount of degradation of the node apparatus #3 on the start node side" and "the amount of degradation dependent on the number of spans" with "the permissible amount of degradation at the node apparatus #3". In the embodiment, the cumulative amount of degradation of the node apparatus #3 on the start node side is "4" and the amount of degradation dependent on the number of spans is "1.4" and the permissible amount of degradation at the node apparatus #3 is "7". More specifically, the sum of "the cumulative amount of degradation the node apparatus #3 on the start node" and "the amount of degradation depending on the number of spans" is lower than "the permissible amount of degradation at the node apparatus #3". In such a case, the node apparatus #3 determines that the optical transmission route B is reachable.

In the first embodiment, the node apparatus between the start node and the end node determines reachability of a new optical transmission route. For example, when a substitute route is set up in addition to an existing optical transmission route, it is assumed that the substitute route partly overlaps the existing optical transmission route. In such a case, a node apparatus at the node where the substitute route and the existing optical transmission route join together may determine reachability of the substitute node. In the method of the first embodiment, the node apparatus may determine reachability of a specified optical transmission route within a shorter period of time as opposed to a method in which a node apparatus located at an end node determines reachability after a parameter related to signal degradation is transmitted from a start node to the end node.

Figure 9:
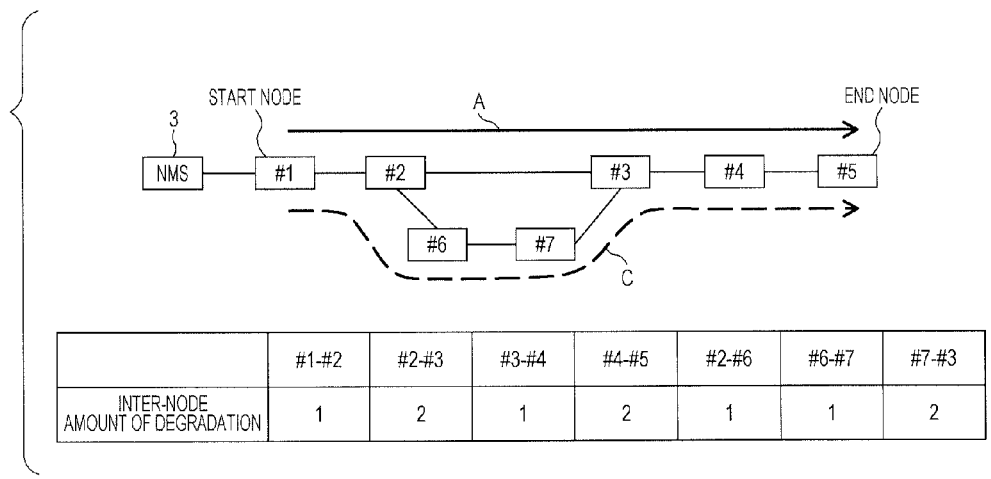
FIG. 9 illustrates another example of the transmission reachability determination method of the first embodiment.

FIG. 9 illustrates another example of a transmission reachability determination method of the first embodiment. In the example of FIG. 9, an optical path is already set up along the optical transmission route A of FIG. 2. In other words, the node apparatuses #1 through #5 store parameters of the optical transmission route A as listed in FIG. 6 (the degradation information and the number-of-span information). Each of the node apparatuses #1 through #7 stores a parameter (inter-node amount of degradation) representing an amount of degradation to an adjacent node apparatus along the transmission route. The node apparatuses #1 through #7 include the number of spans dependent amount of degradation databases of FIG. 8.

Under this situation, the network management system 3 sets a new optical transmission route C between the nodes #1 and #5. The network management system 3 then supplies to the node apparatus #1 a determination instruction containing the routing information representing the optical transmission route C.

Operation of each node apparatus of FIG. 9 is substantially identical to the operation of the embodiment described with reference to FIG. 2. More specifically, each node apparatus transmits the determination message to the downstream side while updating the cumulative parameter and the number of spans. Each node apparatus checks whether the node apparatus stores a parameter representing the cumulative amount of degradation along the transmission route from the node apparatus to the node apparatus #5.

The node apparatus #2 stores a parameter corresponding to the transmission route from the node apparatus #2 to the node apparatus #5 along the optical transmission route A as illustrated in FIG. 6. Node apparatuses #3 and #4 are arranged between node apparatuses #2 and #5 along the optical transmission route A while node apparatuses #6, #7, #3, and #4 are arranged between node apparatuses #2 and #5 along the optical transmission route C. In other words, the node apparatus #2 does not store a parameter representing the cumulative amount of degradation along the transmission route that extends to the node apparatus #5 via the node apparatuses #6, #7, #3, and #4. The node apparatus #2 does not determine reachability of the optical transmission route C.

The node apparatus #3 stores a parameter corresponding to the transmission route from the node apparatus #2 to the node apparatus #5 along the optical transmission route A as illustrated in FIG. 6. The route from the node apparatus #3 to the node apparatus #5 is commonly shared by the optical transmission route A and the optical transmission route C. The node apparatus #3 determines transmission reachability of the optical transmission route C using the parameter of the optical transmission route A. As illustrated in FIG. 9, the method of the node apparatus #3 that determines the transmission reachability is substantially identical to the method of the embodiment of FIG. 2 and the discussion thereof is omitted herein.

Figure 10:
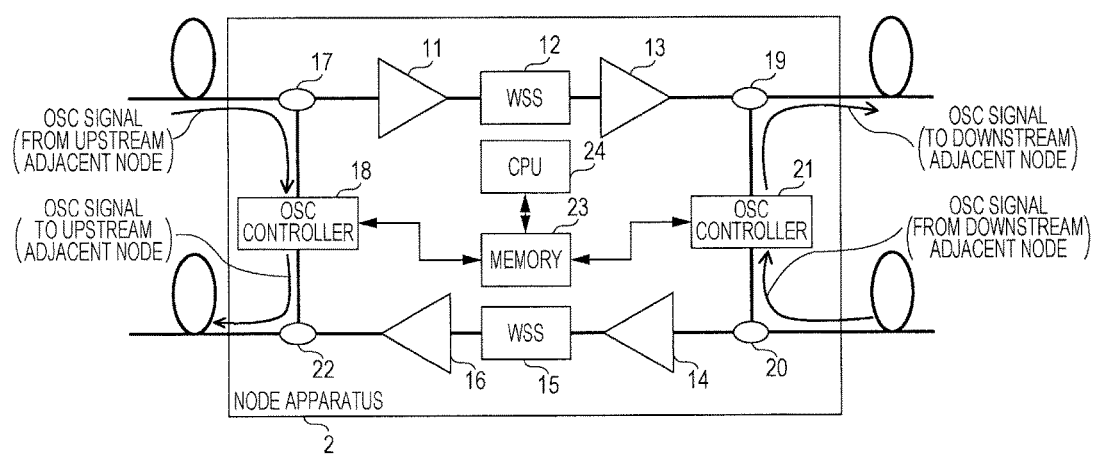
FIG. 10 illustrates a configuration of the node apparatus.

FIG. 10 illustrates the configuration of a node apparatus 2. Note that the optical transmission system 1 transmits a wavelength division multiplexing (WDM) signal. The WDM signal includes a plurality of data channels and optical supervisory channels (OSCs). A wavelength different from a wavelength of the data channel is allocated to the OSC channel. The determination message and the response message are transmitted through the OSC channel.

Note that the node apparatus 2 is connected to two adjacent nodes. In the discussion that follows, one adjacent node is referred to as "an upstream adjacent node" and the other adjacent node is referred to as "a downstream adjacent node".

The WDM signal received from the upstream adjacent node, after being amplified by an optical amplifier 11, is guided to a wavelength selective switch (WSS) 12. The wavelength selective switch 12 causes a specified channel to branch off from the WDM signal and guides the specified channel to a client (not illustrated). The wavelength selective switch 12 also inserts a signal from the client into the WDM signal. The WDM signal output from the wavelength selective switch 12, after being amplified by an optical amplifier 13, is transmitted to the downstream adjacent node. Operations of an optical amplifier 14, a wavelength selective switch 15, and an operation amplifier 16 are substantially identical to the operations of the optical amplifier 11, the wavelength selective switch 12, and the optical amplifier 13, and the discussion thereof is thus omitted herein.

A WDM coupler 17 causes an OSC signal to branch off from the WDM signal received from the upstream adjacent node and guides the OSC signal to an OSC controller 18. In the transmission reachability determination, the OSC controller 18 extracts a message (such as a determination message) from the received OSC signal and then writes the message on a memory 23. Similarly, a WDM coupler 20 causes an OSC signal to branch off from the WDM signal received from the downstream adjacent node and guides the OSC signal to an OSC controller 21. In the transmission reachability determination, the OSC controller 21 extracts a message (such as a response message) from the received OSC signal and then writes the message in the memory 23.

A central processing unit (CPU) 24 processes a message received from the adjacent node. More specifically, upon receiving a determination message from the adjacent node, the CPU 24 executes the process of the flowchart of FIG. 5. In this way, the cumulative parameter and the number of spans contained in the determination message are updated. Upon receiving the response message from the adjacent node, the CPU 24 executes the process of the flowchart of FIG. 7. The CPU 24 further performs the transmission reachability determination of an optical transmission route specified by the determination message.

The OSC controller 21 reads from the memory 23 a determination message updated by the CPU 24, and then generates an OSC signal. A WDM coupler 19 inserts the OSC signal into the WDM signal. The WDM signal with the OSC signal inserted therein is then transmitted to the downstream adjacent node. The OSC controller 18 reads a response message from the memory 23 and generates an OSC signal. A WDM coupler 22 inserts the OSC signal into the WDM signal. The WDM signal with the OSC signal inserted therein is transmitted to the upstream adjacent node.

The CPU 24 may perform another process in addition to the transmission reachability determination process. The memory 23 may store data unrelated to the transmission reachability determination process.

Figure 11:
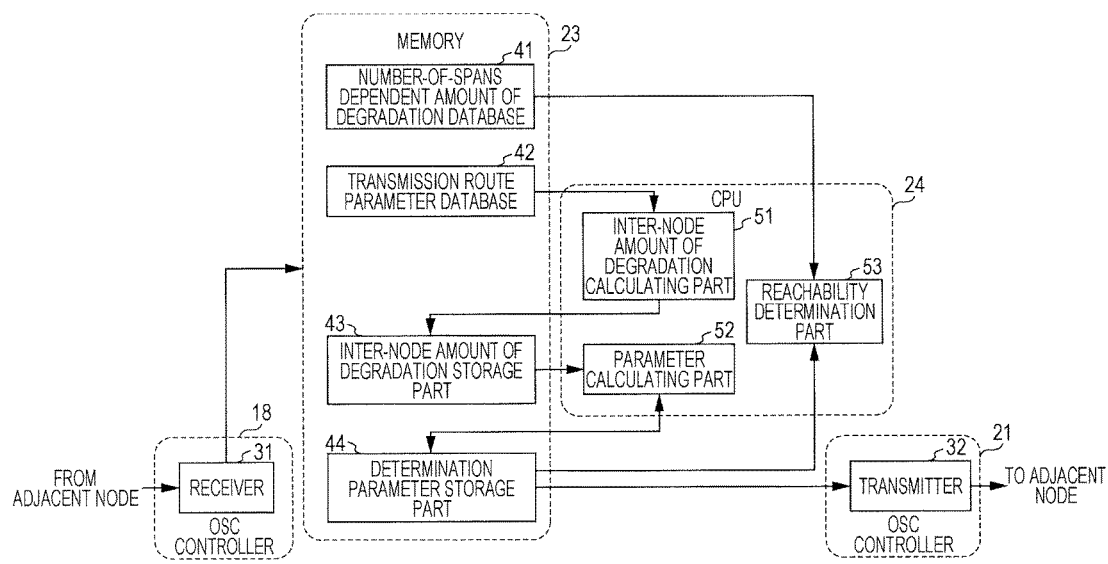
FIG. 11 is a functional block diagram of the node apparatus.

FIG. 11 is a functional block diagram of the node apparatus 2. Note that FIG. 11 illustrates functions related to the transmission reachability determination of the optical transmission route.

The OSC controller 18 includes a receiver 31 that receives a determination message transmitted in the OSC signal. The determination message received by the receiver 31 is stored in the memory 23. The OSC controller 21 includes a transmitter 32 that transmits the determination message updated by the CPU 24 using the OSC signal.

The memory 23 includes a number of spans dependent amount of degradation database 41, a transmission route parameter database 42, an inter-node amount of degradation storage part 43, and a determination parameter storage part 44. As illustrated in FIG. 8, in the number of spans dependent amount of degradation database 41, a correspondence relationship between the number of spans and the amount of degradation is stored. In the transmission route parameter database 42, information representing characteristics of optical fiber between nodes is stored. As an example, in the transmission route parameter database 42, information representing a type, loss, and dispersion of optical fiber are stored. In the inter-node amount of degradation storage part 43, the amount of degradation along the transmission route between adjacent nodes is stored. As illustrated in FIG. 6, in the determination parameter storage part 44, the cumulative amount of degradation (on the start node side and on the end node side), the number of spans (on the start node side and on the end node side), and the permissible amount of degradation on each specified optical transmission route are stored.

The CPU 24 includes an inter-node amount of degradation calculating part 51, a parameter calculating part 52, and a reachability determination part 53. The inter-node amount of degradation calculating part 51 calculates an inter-node amount of degradation in accordance with a given condition. For example, if the type, loss, and dispersion of the optical fiber and a distance to an adjacent node are given, the inter-node amount of degradation calculating part 51 may calculate the inter-node amount of degradation by referring to the transmission route parameter database 42. Optionally, the inter-node amount of degradation calculating part 51 may calculate the inter-node amount of degradation in response to an optical signal transmitted from the adjacent node. The inter-node amount of degradation calculated by the inter-node amount of degradation calculating part 51 may be stored in the inter-node amount of degradation storage part 43.

The parameter calculating part 52 updates the cumulative parameter and the number of spans obtained from the determination message received by the node apparatus. The cumulative parameter is then updated in accordance with the inter-node amount of degradation stored in the inter-node amount of degradation storage part 43. The number of spans is incremented. The updated cumulative parameter and the number of spans incremented are stored in the determination parameter storage part 44 as "the cumulative amount of degradation on the start node side" and "the number of spans on the start node side". The updated cumulative parameter and the number of spans incremented are written on the determination message and then transmitted to an adjacent node on the downstream side.

When the node apparatus 2 receives the response message from the downstream adjacent node, the parameter calculating part 52 may perform S11 through S13 of FIG. 7. In such a case, the parameter calculating part 52 calculates "the cumulative amount of degradation on the start node side", "the number of spans on the start node side", and "the permissible amount of degradation" and then stores the calculation results on the determination parameter storage part 44.

Figure 12:
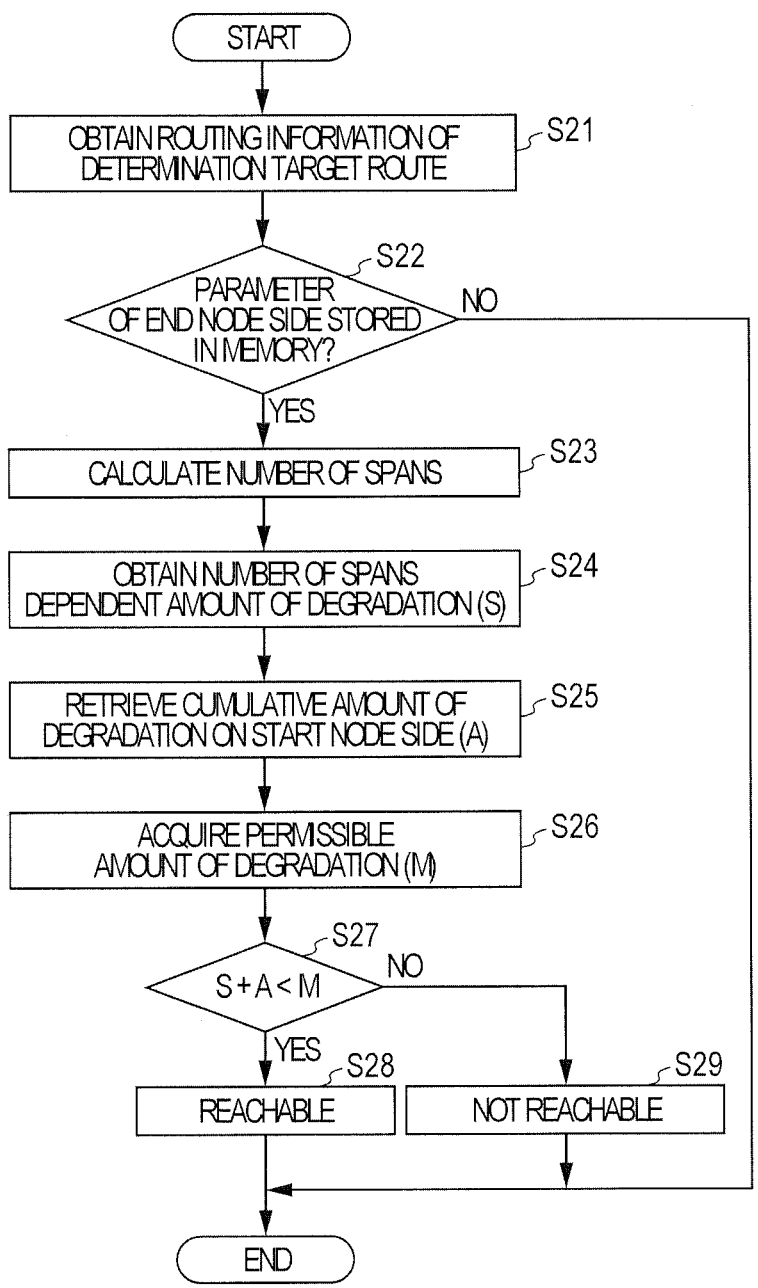
FIG. 12 is a flowchart illustrating a process of a transmission reachability determination unit.

The reachability determination part 53 determines the transmission reachability of the specified optical transmission route. The process of the reachability determination part 53 is described with reference to a flowchart of FIG. 12.

In S21, the reachability determination part 53 obtains the routing information representing a determination target route. The routing information is generated by the network management system 3, and the node apparatus 2 receives the routing information from the adjacent node on the upstream side. In the embodiment, the routing information is contained in the determination message of FIG. 3 and the determination message with the routing information contained therein is then transmitted.

In S22, the reachability determination part 53 checks whether the parameter on the end node side is stored in the memory 23. In this case, the reachability determination part 53 checks whether the parameter of the transmission route extending from the node apparatus to the end node via the determination target route is stored in the determination parameter storage part 44. If the parameter of the end node side is stored in the memory 23, the reachability determination part 53 proceeds to S23. If the parameter of the end node side is not stored in the memory 23, the reachability determination part 53 does not perform the determination process.

In S23, the reachability determination part 53 calculates the total number of spans between the start node and the end node. The total number of spans is the sum of the number of spans on the start node side and the number of spans on the end node side. The number of spans on the start node side is obtained by incrementing "the number of spans" contained in the received message. The number of spans of the end node side may be retrieved from the determination parameter storage part 44.

In S24, the reachability determination part 53 retrieves the number of spans dependent amount of degradation corresponding to the total number of spans. The number of spans dependent amount of degradation may be retrieved from the number of spans dependent amount of degradation database 41.

In S25, the reachability determination part 53 retrieves the cumulative amount of degradation on the start node side from the determination parameter storage part 44. The parameter calculating part 52 obtains the cumulative amount of degradation on the start node side by adding "the inter-node amount of degradation" stored in the inter-node amount of degradation storage part 43 to "the cumulative parameter" contained in the received message. In S26, the reachability determination part 53 retrieves the permissible amount of degradation from the determination parameter storage part 44.

In S27, the reachability determination part 53 compares the sum of the number of spans dependent amount of degradation and the cumulative amount of degradation on the start node side with the permissible amount of degradation. If the sum of the number of spans dependent amount of degradation and the cumulative amount of degradation on the start node side is lower than the permissible amount of degradation, the reachability determination part 53 determines in S28 that the target route is reachable. If not, the reachability determination part 53 determines in S29 that the target route is not reachable.

In S26, the reachability determination part 53 may retrieve the cumulative amount of degradation on the end node side instead of the permissible amount of degradation. In such a case, in S27, the reachability determination part 53 compares the sum of the number of spans dependent amount of degradation, the cumulative amount of degradation on the start node side, and the cumulative amount of degradation on the end node side with a threshold value (maximum amount of degradation) to determine reachability of the optical transmission route. In response to comparison results, the reachability determination part 53 determines reachability of the optical transmission route.

For simplicity of explanation, the amount of degradation is represented by a virtual value in the embodiment. The amount of degradation is "added" on each node apparatus to obtain the cumulative amount of degradation. The calculation method of the cumulative amount of degradation becomes different depending on what parameter is used for the amount of degradation of the optical signal. In the following example, reachability of the optical transmission route is determined using optical signal-to-noise ratio (OSNR) as a parameter representing the signal degradation.

Figures 13A, 13B:
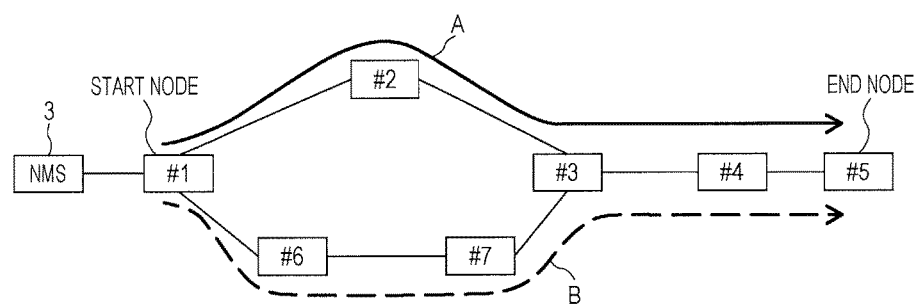

FIG. 13A through FIG. 13C illustrate an embodiment that determines reachability of the optical transmission route in accordance with OSNR. The configuration of the network FIG. 13A remains unchanged from that of FIG. 2. The optical transmission system includes the node apparatuses #1 through #7. The inter-node amount of degradation is expressed by OSNR [dB] as illustrated in FIG. 13B. For example, OSNR between the nodes #1 and #2 is "30 dB", and OSNR between the nodes #2 and #3 is "25 dB". Note that OSNR between nodes is obtained beforehand by measurement.

In the same way as in FIG. 2, an optical path is set on the optical transmission route A (#1, #2, #3, #4, and #5). As illustrated in FIG. 13C, in memories of the node apparatuses #1 through #5, determination parameters corresponding thereto are stored. The determination parameters include "a cumulative OSNR on the start node side", "number of spans on the start node side", "a cumulative OSNR on the end node side", "number of spans on the end node side", and "a permissible OSNR".

Upon receiving "the cumulative OSNR on the start node side" in the determination message from the adjacent node on the upstream side, each node apparatus updates the value of the cumulative OSNR, and then transmits the updated value to the adjacent node on the downstream side. Since OSNR is represented by [dB], the cumulative value is calculated logarithmically.

For example, OSNR between nodes #1 and #2 is "30 dB", and OSNR between nodes #2 and #3 is "25 dB". In such a case, the node apparatus #3 combines 30 dB and 25 dB, thereby obtaining "a cumulative OSNR of 25.9 dB of a route extending from the node #1 to the node #3 via the node #2". OSNR between nodes #3 and #4 is "28 dB". The node apparatus #4 combines 25.9 dB and 28 dB, thereby obtaining "a cumulative OSNR of 23.4 dB of a route extending from the node #1 to the node #4 via the nodes #2 and #3". The other parameters are calculated in a similar fashion.

In FIG. 13A, reachability of the optical transmission route B (#1, #6, #7, #3, #4, and #5) is determined. OSNR between nodes #1 and #6 is "24 dB", OSNR between nodes #6 and #7 is "29 dB", and OSNR between nodes #7 and #3 is "31 dB". The node apparatus #3 combines 24 dB, 29 dB, and 31 dB, thereby obtaining "a cumulative OSNR of 22.2 dB of a route extending from the node #1 to the node #3 via nodes #6 and #7".

The node apparatus #3 determine reachability of the optical transmission route B using the parameters obtained from the optical transmission route A. A permissible OSNR calculated for the route extending from node #3 to node #5 via node #4 is "15.7 dB" as illustrated in FIG. 13C. In this example, a threshold OSNR that is used to determine reachability is 15 dB.

The cumulative OSNR (22.2 dB) of the route extending from node #1 to node #3 via nodes #6 and #7 is higher than the permissible OSNR. In other words, when an optical signal propagates from node #1 to node #3 via nodes #6 and #7, and then arrives at node #5 via node #4, OSNR at node #5 may be higher than the threshold OSNR. The node apparatus #3 thus determines that the optical transmission route B is reachable.

To determine reachability in view of the number of spans dependent amount of degradation, a value resulting from subtracting the number of spans dependent amount of degradation from the cumulative OSNR is compared with the permissible OSNR. For example, the total number of spans along the optical transmission route B is five in the example of FIG. 13A. By referencing the database of FIG. 8, 1.4 dB is obtained as the number of spans dependent amount of degradation of the optical transmission route B. In this case, the value (20.8 dB) resulting from subtracting the number of spans dependent amount of degradation from the cumulative OSNR is higher than the permissible OSNR (15.7 dB), and the optical transmission route B is determined to be reachable.

Figure 14:
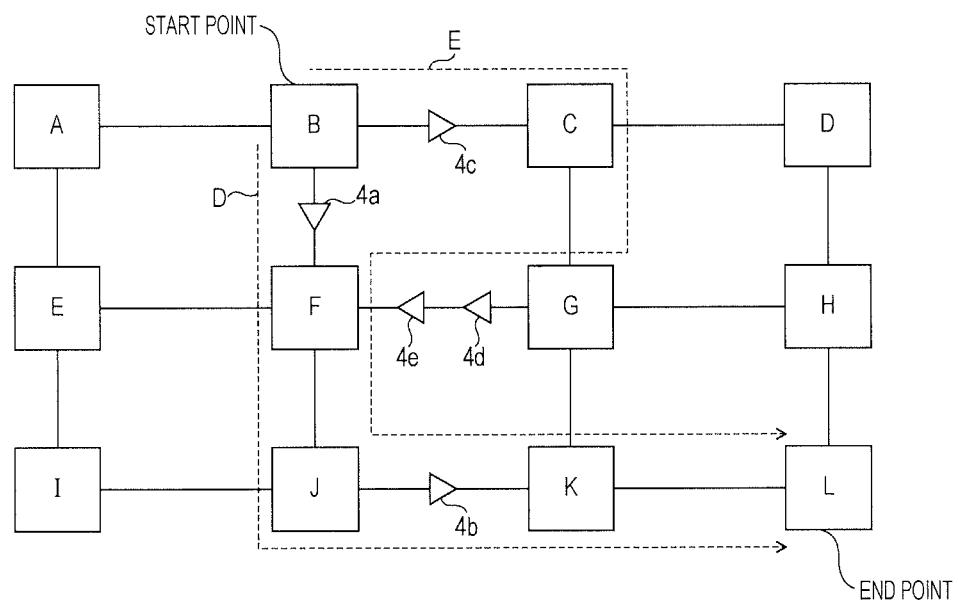
FIG. 14 illustrates a method of counting the number of spans in view of an optical amplifier.

A large-scale optical transmission system may include an in-line amplifier (ILA) as an optical amplifier between any node apparatuses. Unlike the node apparatus, the optical amplifier does not contribute to changing a transmission route of an optical signal. For this reason, the network management system 3 is free from accounting for the optical amplifier when the optical transmission route is specified using the routing information. For example, an optical transmission route D of FIG. 14 is represented by the routing information (#B, #F, #3, #K, and #L). An optical amplifier 4a between nodes #B and #F and an optical amplifier 4b between nodes #3 and #K are omitted in the routing information.

However, quality of an optical signal is decreased by noise or other factors when the optical signal is amplified by the optical amplifier. For this reason, it is desirable to account for not only the number of node apparatuses on a route but also the number of optical amplifiers along the route in the determination of the reachability of the optical transmission route.

In the first embodiment, "the number of spans" is set up in the determination message. As described above, the number of spans is incremented each time the determination message passes through each node apparatus. In addition, the number of spans contained in the determination message is also incremented at each optical amplifier.

Figure 15:
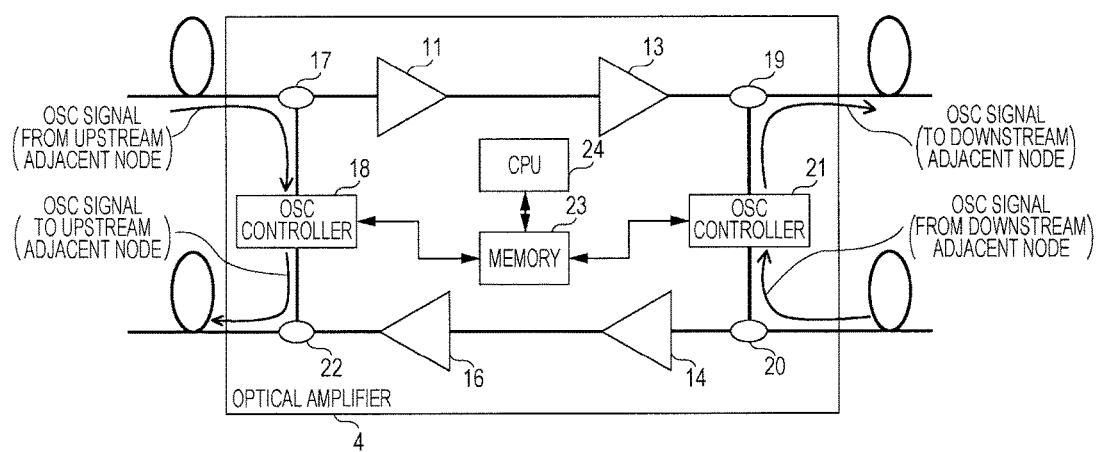
FIG. 15 illustrates a configuration of the optical amplifier.

FIG. 15 illustrates a configuration of an optical amplifier 4. The configuration of the optical amplifier 4 is similar to the configuration of the node apparatus 2 of FIG. 10. However, the optical amplifier 4 does not include the wavelength selective switches 12 and 15. The optical amplifiers 4a through 4e of FIG. 14 are collectively referred to as the optical amplifier 4.

The CPU 24 in the optical amplifier 4 of FIG. 15 processes a received message. When the optical amplifier 4 receives the determination message, the CPU 24 increments the number of spans contained in the determination message.

The optical transmission system of FIG. 14 may now perform the transmission reachability determination on an optical transmission route E. In this case, a network management system gives the routing information (#B, #C, #G, #F, #J, #K, and #L) to a node apparatus #B. The node apparatus #B then transmits the determination message. "The number of spans" contained in the determination message is incremented by each of the optical amplifier 4c, the node apparatus #C, the node apparatus #G, the optical amplifier 4d, the optical amplifier 4e, the node apparatus #F, . . . . The node apparatus #F thus detects "6" as the number of spans of a route extending from the node apparatus #B to the node apparatus #F along the optical transmission route E.

According to the first embodiment, the number of spans of the optical transmission route is correctly counted even if the routing information generated by the network management system indicates only the node apparatuses. The reachability of the optical transmission route is determined by accurately accounting for the effect of the number of spans dependent amount of degradation.

The parameter representing the amount of signal degradation is not limited to OSNR. For example, the parameters representing the amount of signal degradation may include wavelength dispersion, polarization mode dispersion, and polarization dependent loss. The parameter is at least updated each time the parameter passes through each node apparatus so that the parameter at a node of interest indicates a cumulative value from the start node down to the node of interest.

Second Embodiment

In a second embodiment, the transmission quality of an optical transmission route that transmits an optical signal is measured beforehand. When a new optical transmission route is set up, reachability of the new optical transmission route is determined using a transmission quality measured beforehand.

Figures 16A, 16B:
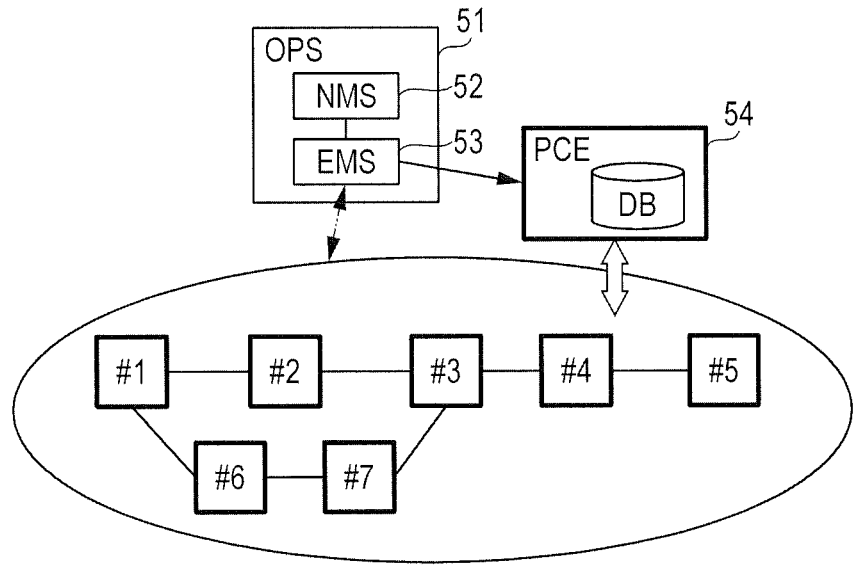
FIG. 16A through FIG. 16B illustrate an example of an optical transmission system of a second embodiment.

In an example of FIG. 16A through FIG. 16B, the transmission quality of each of ten optical transmission routes (optical transmission routes) is premeasured. The transmission quality is measured by a bit error rate (BER). The bit error rate is measured using forward error correction (FEC).

In FIG. 16A, an operation system (OPS) 51 includes a network management system (NMS) 52, and an element management system (EMS) 53. The network management system 52 manages an operation and state of the optical transmission system. The element management system 53 collects measurement results of the bit error rates from node apparatuses (#1 through #7) in response to an instruction from the network management system 52. A path calculation engine (PCE) 54 manages bit error rate data of the transmission route collected by the element management system 53. As illustrated in FIG. 16B, the bit error rate of each transmission route is converted into a Q value. The Q value is a parameter representing a signal quality. The higher the signal quality is, the higher the Q value is. The lower the signal quality is, the lower the Q value is.

As illustrated in FIG. 16B, Q0 is a minimum Q value that enables optical communications in the optical transmission system, and serves as a threshold value according to which reachability is determined. More specifically, if the Q value of the transmission route is higher than the threshold Q0 value, that transmission route is determined as reachable. On the other hand, if the Q value of the transmission route is lower than the threshold Q0 value, that transmission route is determined as not reachable. A difference between the Q value of a given transmission route and the threshold Q0 value is interpreted as a margin of the transmission reachability of that transmission route. For example, the Q value of the transmission route from #1 to #2 is "Q1", and a Q value margin of the transmission route is "Q1-Q0".

The path calculation engine 54 manages the bit error rate, the Q value, and the Q value margin on a per transmission route basis. These pieces of information are stored in a database of the path calculation engine 54. The path calculation engine 54 also periodically distributes to node apparatuses operating thereunder (node apparatuses #1 through #7 herein) the database that stores and manages the bit error rate, the Q value, and the Q value margin. As a result, the path calculation engine 54 establishes synchronization with the database of each of the node apparatuses.

The transmission reachability of a new optical transmission route (#1, #6, #7, #3, #4, and #5) may now be determined in the optical transmission system. On the optical transmission route (#1, #2, #3, #4, and #5), a bit error rate BER 4 is already measured and a Q value margin "Q4-Q0" is obtained. The optical transmission route (#1, #2, #3, #4, and #5) is already determined as being reachable. A route from node #3 to #5 is commonly shared by the optical transmission route (#1, #2, #3, #4, and #5) and the optical transmission route (#1, #6, #7, #3, #4, and #5). If the Q value of the route (#1, #2, and #3) is compared with the Q value of the route (#1, #6, #7, and #3), the transmission reachability of the optical transmission route (#1, #6, #7, #3, #4, and #5) is determined.

Figure 17:
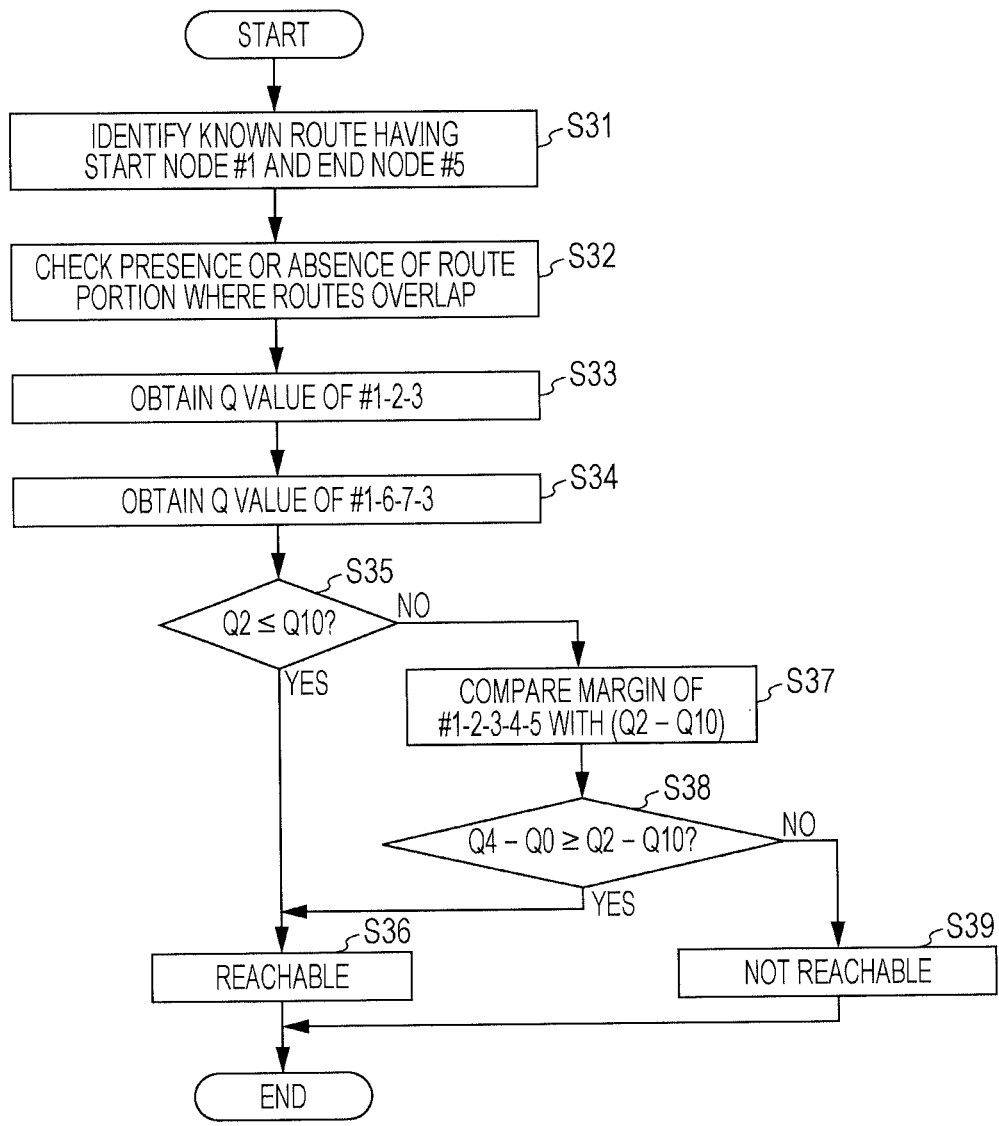
FIG. 17 is a flowchart illustrating a process for determining transmission reachability of a route of the embodiment of FIG. 16A through FIG. 16B.

FIG. 17 is a flowchart illustrating a process for determining reachability of the optical transmission route of FIG. 16A through FIG. 16B. The process of the flowchart is executable on any of the node apparatuses. In one example, the start node apparatus of the transmission route as a determination target performs the process. Note that the node apparatus that performs the transmission reachability determination includes the database of FIG. 16B. In the following discussion, a route from which BER and the Q value have already been obtained is referred to as a "known route" and a route on which the transmission reachability determination is to be performed is referred to as a "new route". Note that the known route has a margin with respect to the threshold Q0 value, and is determined as being reachable.

In S31, the node apparatus identifies a known route having a start node #1 and an end node #5. In this example, the node apparatus identifies the optical transmission route (#1, #2, #3, #4, and #5). The node apparatus obtains the bit error rate (BER 4) and the Q value (Q4) of the identified known route.

In S32, the node apparatus checks the routes for a route portion where the identified known route overlaps the new route. In this example, a partial route (#3, #4, and #5) is commonly shared by the known route and the new route.

In S33, the node apparatus obtains the Q value of a portion of the known route that does not overlap the new route. In this example, "Q2" is obtained from the partial route (#1, #2, and #3). In S34, the node apparatus obtains the Q value of a portion of the new route that does not overlap the known route. In this example, "Q10" is obtained from the partial route (#1, #6, #7, and #3).

In S35, the node apparatus compares Q2 with Q10. If Q10 is equal to or higher in value than Q2, the node apparatus determines that the quality of the optical signal that is transmitted along the new route is equal to or higher than the quality of the optical signal that is transmitted along the known route. More specifically, the node apparatus determines that the amount of degradation generated along the new route is equal to or lower than the amount of degradation generated along the known route. Note that the known route is determined as being reachable. If Q10 is equal to or higher than Q2, the node apparatus determines in S36 that the new route is reachable.

If Q10 is lower in value than Q2, the node apparatus compares a difference "Q4-Q0" with a difference "Q2-Q10". The difference "Q4-Q0" represents a margin of the known route. The difference "Q2-Q10" represents a difference between the Q value of the partial route (#1, #2, and #3) of the known route and the Q value of the partial route (#1, #6, #7, and #3) of the new route.

A relationship "Q4-Q0≥Q2-Q10" is interpreted to mean that a difference between the quality of the known route and the quality of the new route is equal to or lower than the margin of the known route. If the new route is substituted for the known route in this case, quality is decreased between nodes #1 and #3. This amount of degradation is equal to or lower than the margin of the known route. In this case, the node apparatus determines in S36 that the new route is reachable.

A relationship "Q4-Q0<Q2-Q10" is interpreted to mean that a difference between the quality of the known route and the quality of the new route is higher than the margin of the known route. If the new route is substituted for the known route in this case, the amount of degradation between nodes #1 and #3 becomes higher than the margin of the known route. In this case, the node apparatus determines in S39 that the new route is not reachable.

According to the second embodiment, if the new route partially overlaps the known route, the node apparatus determines the transmission reachability of the new route in accordance with the difference between the qualities of the portions of the new route and the known route that do not overlap each other. In other words, the transmission reachability of the new route may be determined without measuring the quality of the entire new route. This arrangement reduces time to determine the transmission reachability of the new optical transmission route.

In the second embodiment, the amount of non-linear degradation depending on the number of spans of the transmission route may be accounted for. In this case, the node apparatus may obtain a Q value conversion coefficient α responsive to the total number of spans of the new route. Note that a correspondence relationship between the number of spans and the Q value conversion coefficient α is determined beforehand by measurement or in simulation. The node apparatus determines the transmission reachability of the new route using the Q value conversion coefficient α.

The total number of spans of the new route (#1, #6, #7, #3, #4, and #5) is five in the example of FIG. 16A, FIG. 16B through FIG. 17. The node apparatus thus obtains the Q value conversion coefficient α responsive to "the number of spans=5". The transmission reachability determination process is performed with "Q10-α" substituted for "Q10" in the flowchart of FIG. 17.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reachability determination method comprising:
   detecting an overlap portion of a first route and a second route where a start node and an end node of the first route respectively match a start node and an end node of the second route;
   retrieving measured first quality information representing a quality of an optical signal that is obtained when the optical signal is transmitted from the start node to the end of the first route;
   determining, executed by a processor, when the first quality information is above a predetermined threshold, the first route is reachable;
   retrieving measured second quality information representing a quality of the optical signal that is obtained when the optical signal is transmitted along a partial route of the first route other than the overlap portion of the first route;
   retrieving measured third quality information representing a quality of the optical signal that is obtained when the optical signal is transmitted along a partial route of the second route other than the overlap portion of the second route;
   comparing, executed by the processor, the second quality information with the third quality information;
   when the third quality information is greater than or equal to the second quality information, determining, executed by the processor, the second route is reachable; and
   when the third quality information is less than the second quality information, determining, executed by the processor, the second route is not reachable.

2. A node apparatus comprising:
   a receiver; and
   a processor coupled to the receiver and configured to:
      detect an overlap portion of a first route and a second route where a start node and an end node of the first route respectively match a start node and an end node of the second route,
      retrieve measured first quality information representing a quality of an optical signal that is obtained when the optical signal is transmitted from the start node to the end of the first route,
      determine when the first quality information is above a predetermined threshold, the first route is reachable,
      retrieve measured second quality information representing a quality of the optical signal that is obtained when the optical signal is transmitted along a partial route of the first route other than the overlap portion of the first route,
      retrieve measured third quality information representing a quality of the optical signal that is obtained when the optical signal is transmitted along a partial route of the second route other than the overlap portion of the second route, compare the second quality information with the third quality information, when the third quality information is greater than or equal to the second quality information, determine the second route is reachable, and when the third quality information is less than the second quality information, determine the second route is not reachable.

3. An optical transmission system comprising:

a plurality of node apparatuses installed at nodes located on a first route from a start node to an end node, wherein each of the node apparatuses includes:

a receiver configured to:

receive first quality information representing a quality of an optical signal that is obtained when the optical signal is transmitted from the start node to the end of the first route, receive measured second quality information representing a quality of the optical signal that is obtained when the optical signal is transmitted along a partial route of the first route other than an overlap portion of the first route, and receive measured third quality information representing a quality of the optical signal that is obtained when the optical signal is transmitted along a partial route of a second route other than the overlap portion of the second route;

a processor coupled to the receiver and configured to:

detect the overlap portion of the first route and the second route where a start node and an end node of the first route respectively match the start node and an end node of the second route, determine when the first quality information is above a predetermined threshold, the first route is reachable, compare the second quality information with the third quality information, when the third quality information is greater than or equal to the second quality information, determine the second route is reachable, and when the third quality information is less than the second quality information, determine the second route is not reachable.

\* \* \* \* \*